(12) United States Patent
Durairaj et al.

(10) Patent No.: US 7,279,515 B2
(45) Date of Patent: Oct. 9, 2007

(54) RESORCINOL CARBONATE-BASED PHOSPHATE ESTER COMPOUNDS AS FLAME RETARDANTS

(76) Inventors: Raj B. Durairaj, 123 Edgemeade Dr., Monroeville, PA (US) 15146; Gary A. Jesionowski, 333 Haugh Dr., Pittsburgh, PA (US) 15237

( * ) Notice: Subject to any disclaimer, the term of this patent is extended or adjusted under 35 U.S.C. 154(b) by 179 days.

(21) Appl. No.: 11/233,574

(22) Filed: Sep. 21, 2005

(65) Prior Publication Data

US 2006/0063866 A1    Mar. 23, 2006

Related U.S. Application Data

(60) Provisional application No. 60/612,021, filed on Sep. 22, 2004.

(51) Int. Cl.
*C08K 5/49* (2006.01)
*C08K 5/521* (2006.01)
*C09K 21/00* (2006.01)
*C07F 9/02* (2006.01)

(52) U.S. Cl. ............... 524/117; 524/119; 524/127; 524/145; 252/609; 558/71; 558/77; 558/87; 558/207

(58) Field of Classification Search ............... 252/609; 524/117, 119, 127, 145; 558/71, 77, 87, 558/207
See application file for complete search history.

(56) References Cited

U.S. PATENT DOCUMENTS

| 5,204,394 A | 4/1993 | Gosens et al. |
| 5,418,317 A | 5/1995 | Raymond |
| 5,602,201 A | 2/1997 | Fujiguchi et al. |
| 6,204,313 B1 | 3/2001 | Bastiaens et al. |
| 6,583,256 B2 | 6/2003 | Vollenberg et al. |

FOREIGN PATENT DOCUMENTS

| EP | 0509506 A2 | 10/1992 |
| JP | 63-210184 | 8/1988 |
| JP | 2002-138283 | 5/2002 |

OTHER PUBLICATIONS

Raj Durairaj, "Flame Retardant" in "Resorcinol: Chemistry, Technology and Applications," Springer Verlag Publisher, Chapter 8.2, pp. 592-631 (Dec. 2005).

*Primary Examiner*—Kriellion A Sanders

(57) ABSTRACT

Resorcinol carbonate-based phosphate esters are prepared by reacting resorcinol carbonates with phosphorous oxychloride or a chlorophosphate. The resorcinol carbonates can be synthesized by the reaction of resorcinol with phosgene or diphenyl carbonate. The resorcinol carbonate-based phosphate esters can be used as flame retardants and perhaps flowing agents.

40 Claims, No Drawings

RESORCINOL CARBONATE-BASED PHOSPHATE ESTER COMPOUNDS AS FLAME RETARDANTS

PRIOR RELATED APPLICATIONS

This application claims the benefit under 35 U.S.C. § 120 of U.S. Provisional Patent Application Ser. No. 60/612,021, filed Sep. 22, 2004, which is incorporated herein by reference in its entirety.

FIELD OF THE INVENTION

This invention relates to flame retardants comprising phosphate ester compounds, methods for their synthesis and applications thereof, particularly their applications as flame retardants in compositions or articles comprising polymers.

BACKGROUND OF THE INVENTION

Polymers such as plastics, elastomers, and thermosets are used in large volumes in a wide range of applications such as walls, ceilings, furniture, floor coverings, fabrics, electronics, vehicles and electrical appliances. Because most polymers are flammable, fire safety is important in each of these applications. Generally, fire safety of polymers can be improved by incorporating flame retardants into the polymers. Flame retardants consist of compounds added to a material to improve the material's ability to withstand fire and heat or to resist combustion. Flame retardants can function in a variety of ways to reduce the risk of fire hazard. In one way, they can raise the ignition temperature. In the other ways, they can reduce the rate of burning, flame spread, or the generation of toxic gases and smoke. Phosphorus flame retardants can reduce the flammability of the polymer and reduce the generation of toxic gases and smoke.

There are many different kinds of flame retardants which include alumina trihydrate, magnesium hydroxide, halogenated compounds (e.g., chlorinated, fluorinated and brominated compounds), phosphorus compounds (e.g., phosphate esters), antimony oxide, melamine derivatives, and boric acid and other boron compounds. The worldwide sale of flame retardants was 2.35 billion pounds in 2003. It is predicted that the worldwide sale of flame retardants will increase to 2.82 billion pounds in 2008. Among all flame retardants, the two most common kinds are phosphorus flame retardants and halogenated flame retardants. Because of environmental and health concerns over halogenated flame retardants, many parts of Europe are considering bans on some specific halogenated flame retardants. Therefore, the trend is to restrain the use of the halogenated flame retardants and to migrate to other flame retardants such as phosphorus flame retardants. Some examples of phosphorus flame retardants currently in the market includes phosphate ester type flame retardants such as resorcinol bis(diphenyl phosphate) (RDP), bisphenol A bis(diphenyl phosphate), monomeric aromatic phosphate ester compounds (e.g., triphenyl phosphate and tricresyl phosphate) and the like. In general, resorcinol-based phosphate ester flame retardants such as RDP have some more desirable properties over the bisphenol A-based phosphate ester flame retardants because of the presence of meta-phenylene linkages in the former.

Some well known polymers, such as polycarbonates (PC) and polyphenylene oxide (PPO), have a wide range of industrial applications. In order to improve their impact strength properties, they are often blended with acrylonitrile-butadiene-styrene terpolymer (ABS) and high-impact polystyrene (HIPS). Since ABS and HIPS polymers are mainly hydrocarbon-based materials, they generally have a tendency to burn in the case of accidental fire. Though halogenated flame retardants are widely used with ABS and HIPS polymers, the phosphate ester type flame retardants are proven to be suitable for the PC/ABS and PPO/HIPS blends. It has been well known that resorcinol-based phosphate esters, such as RDP, are widely used in PC/ABS and PPO/HIPS blends as flame retardants. RDP can improve the melt flow properties and processability properties and enhance the char forming characteristics of the PC/ABS and PPO/HIPS blends. Similarly, other resorcinol-based phosphate ester flame retardants may also improve melt flow properties and processability properties of polymers while reducing the flammability of the polymers.

New polymers and polymeric blends are constantly introduced to meet the demands in various electronic and consumer applications. These demands create a need for new flame retardants capable of improving the flammability, melt flow properties and processability properties of the new polymers and polymeric blends. Furthermore, there is a need for resorcinol carbonate-based phosphate ester flame retardants having aromatic carbonate group(s) in the molecule. The presence of carbonate group(s) in the flame retardants could enhance their compatibility with polycarbonates, PC/ABS blends and PPO/HIPS blends, as well as enhance the char forming characteristics of the same. By enhancing their compatibility, the melt flow properties and processability properties, as well as the flammability characteristics, of PC-based and PPO-based polymeric systems can be improved.

SUMMARY OF THE INVENTION

Disclosed herein are new flame retardants that have desirable flame retarding, melt flow and processability properties as well as compatibility with polycarbonates, PC/ABS blends and PPO/HIPS blends.

In one aspect, the flame retardants comprise at least a phosphate ester compound having the formula:

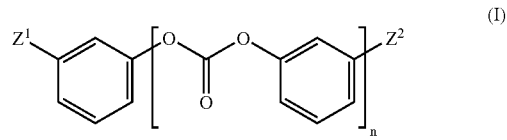

(I)

wherein each of $Z^1$ and $Z^2$ is independently a phosphate ester group; and n is an integer between 1 and 10.

In some embodiments, the phosphate ester group has the formula:

(II)

wherein each of $R^1$ and $R^2$ is independently alkyl, alkenyl, alkynyl, heteroalkyl, aryl, heteroaryl, cycloalkyl, or heterocycloalkyl, or a part of a heterocyclic group when $R^1$ and $R^2$ form the heterocyclic group together with the —O—P(=O)(—O—)—O— fragment; and each of alkyl, alkenyl, alkynyl, heteroalkyl, aryl, heteroaryl, cycloalkyl, heterocycloalkyl, and the heterocyclic group is substituted or unsubstituted.

Disclosed herein are also new processes of making flame retardants that have desirable flame retarding, melt flow and processability properties as well as compatibility with polycarbonates, PC/ABS blends and PPO/HIPS blends.

In one aspect, the process of preparing the flame retardant of Formula (I) where the phosphate ester group is represented by Formula (II) comprises the step of reacting a resorcinol carbonate compound having the formula:

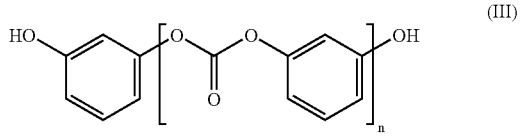

(III)

with at least a chlorophosphate compound having the formula:

(IV)

in the presence of a catalyst or an acid acceptor, wherein n is an integer between 1 and 10;

each of $R^1$ and $R^2$ is independently alkyl, alkenyl, alkynyl, heteroalkyl, aryl, heteroaryl, cycloalkyl, or heterocycloalkyl, or a part of a heterocyclic group when $R^1$ and $R^2$ form the heterocyclic group together with the —O—P(=O)(—Cl)—O— fragment; and each of alkyl, alkenyl, alkynyl, heteroalkyl, aryl, heteroaryl, cycloalkyl, heterocycloalkyl, and the heterocyclic group is substituted or unsubstituted.

In another aspect, the process of preparing the flame retardants disclosed herein comprises the step of reacting a bis-(dichloro)phosphate compound having the formula:

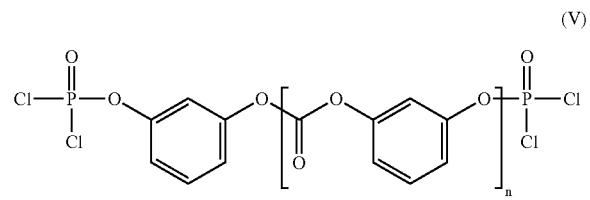

(V)

with at least one hydroxyl compound in the presence of a catalyst, wherein n is an integer between 1 and 10.

Disclosed herein are also new flame retardant compositions comprising a polymer and a flame retardant of Formula (I) and articles comprising the flame retardant compositions.

DESCRIPTION OF EMBODIMENTS OF THE INVENTION

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$ and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Embodiments of the invention provide new resorcinol carbonate-based phosphate ester compounds which can function as flame retardants in compositions or articles comprising polymers such as polycarbonates (PC), poly(phenylene oxide) (PPO), polyesters (e.g., PET and PBT), polycarbonate and acrylonitrile-butadiene-styrene terpolymer (PC/ABS) blends, poly(phenylene oxide) and high-impact polystyrene (PPO/HIPS) blends, and other polymers. Such new resorcinol carbonate-based phosphate ester materials can be used as flame retardants in plastics and other polymeric systems and can improve their flow properties. These new flame retardants may possess enhanced melt flow properties and processability properties compared to resorcinol-based phosphate esters such as RDP. Synthetic procedures to prepare resorcinol carbonate-based phosphate esters are also provided.

In some embodiments, this invention provides flame retardants comprising at least a phosphate ester compound having the formula:

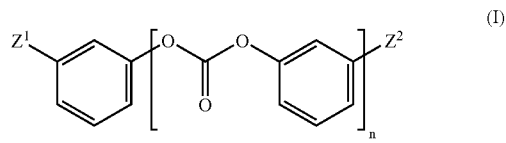

(I)

wherein each of $Z^1$ and $Z^2$ is independently a phosphate ester group; and n is an integer between 1 and 10 or a combination thereof. In other embodiments, the flame retardant can comprise more than one phosphate ester compound of Formula (I). In other embodiments, the flame retardant comprises a first phosphate ester compound of Formula (I) having an n value of 1 and a second phosphate ester compound of Formula (I) having an n value of 2. In further embodiments, the flame retardant further comprises a resorcinol phosphate ester having the formula:

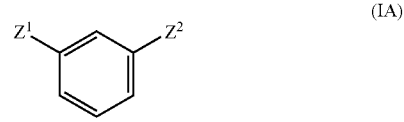

(IA)

wherein each of $Z^1$ and $Z^2$ is independently a phosphate ester group.

Each phosphate ester group in Formulae (I) and (IA) can independently have the formula:

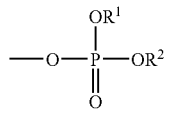

wherein each of $R^1$ and $R^2$ is independently alkyl, alkenyl, alkynyl, heteroalkyl, aryl, heteroaryl, cycloalkyl, or heterocycloalkyl. Each of alkyl, alkenyl, alkynyl, heteroalkyl, aryl, heteroaryl, cycloalkyl, and heterocycloalkyl may be substituted or unsubstituted. Non-limiting examples of the substituted alkyl group include aralkyls such as 4-(nitrophenyl) ethyl. Non-limiting examples of the substituted aryl group include halogenated aryls such as 2,4-dichlorophenyl and alkylated aryls or alkaryls such as, 2-methylphenyl, 4-methylphenyl, and 3,5-dimethylphenyl.

In some embodiments, each of $R^1$ and $R^2$ of Formula (II) is independently a part of a heterocyclic group when $R^1$ and $R^2$ form a heterocyclic group together with the —O—P (=O)(—O—)—O— fragment. The heterocyclic group may be substituted or unsubstituted. Non-limiting examples of such heterocyclic group include the following formulae:

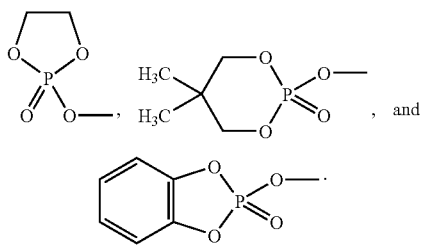

In some embodiments, each of $R^1$ and $R^2$ is independently aryl. In a particular embodiment, each of $R^1$ and $R^2$ is independently phenyl and n is 1. In other embodiments, the phosphate ester group is selected from the group consisting of radicals having the following formulae:

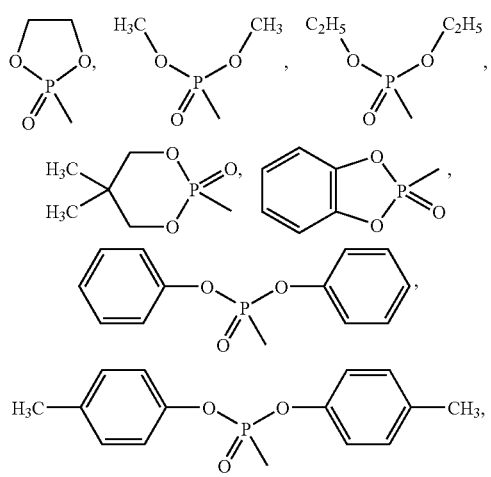

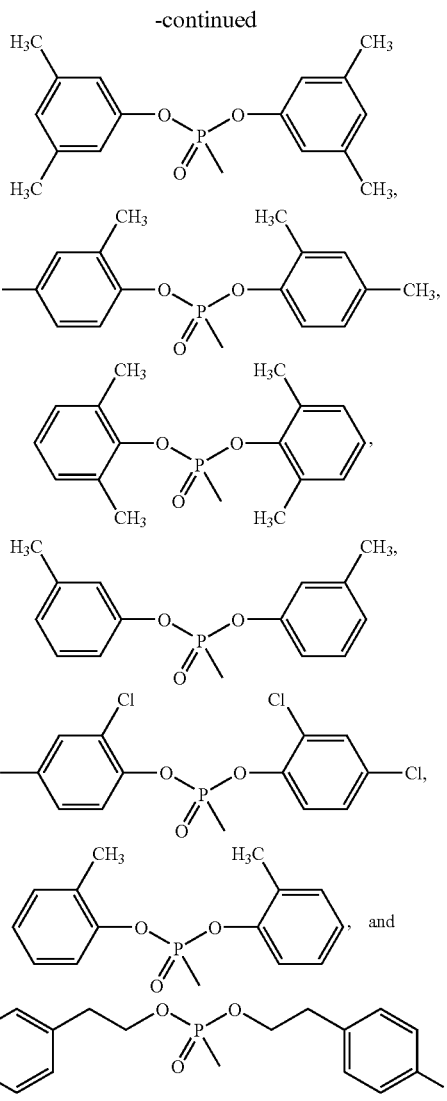

As used herein and unless otherwise indicated, the term "alkyl" or "alkyl group" means a univalent group having the general formula $C_nH_{2n+1}$ derived from removing a hydrogen atom from a saturated, unbranched or branched aliphatic hydrocarbon, where n is an integer, preferably between 1 and 20, more preferably between 1 and 8. Examples of alkyl groups include, but are not limited to, $(C_1-C_8)$alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents. Furthermore, the alkyl group can be branched or unbranched.

As used herein and unless otherwise indicated, the term "heteroalkyl" or "heteroalkyl group" means a univalent group derived from an alkyl group with at least one of the methylene group is replaced by a heteroatom or a heterogroup such as O, S, or NR where R is H or an organic group.

As used herein and unless otherwise indicated, the term "cycloalkyl" or "cycloalkyl group" means a univalent group derived from a cycloalkane by removal of a hydrogen atom from a non-aromatic, monocyclic or polycyclic ring comprising carbon and hydrogen atoms. Examples of cycloalkyl groups include, but are not limited to, $(C_3-C_7)$cycloalkyl groups, such as cyclopropyl, cyclobutyl, cyclopentyl, cyclohexyl, and cycloheptyl, and saturated cyclic and bicyclic terpenes and $(C_3-C_7)$cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic.

As used herein and unless otherwise indicated, the term "heterocycloalkyl" or "heterocycloalkyl group" means a univalent group derived from a monocyclic or polycyclic heterocycloalkane by removal of a hydrogen atom from a ring carbon atom. Non-limiting examples of the heterocycloalkyl group include oxirane, thiirane, aziridine, oxetane, thietane, azetidine, pyrrolidine, tetrahydrothiophene, tetrahydrofuran, 2-pyrrolidinone, 2,5-pyrrolidinedione, dihydro-2(3H)-furanone, dihydro-2,5-furandione, dihydro-2(3H)-thiophenone, 3-aminodihydro-2(3H)-thiophenone, piperidine, 2-piperidinone, 2,6-piperidinedione, tetrahydro-2H-pyran, tetrahydro-2H-pyran-2-one, dihydro-2H-pyran-2,6(3H)-dione, and tetrahydro-4H-thiopyran-4-one. A heterocycloalkyl group can be unsubstituted or substituted with one or more suitable substituents. Furthermore, the heterocycloalkyl group can be monocyclic or polycyclic.

As used herein and unless otherwise indicated, the term "aryl" or "aryl group" means an organic radical derived from a monocyclic or polycyclic aromatic hydrocarbon by removing a hydrogen atom. Non-limiting examples of the aryl group include phenyl, naphthyl, benzyl, or tolanyl group, sexiphenylene, phenanthrenyl, anthracenyl, coronenyl, and tolanylphenyl. An aryl group can be unsubstituted or substituted with one or more suitable substituents. Furthermore, the aryl group can be monocyclic or polycyclic.

As used herein and unless otherwise indicated, the term "heteroaryl" or "heteroaryl group" means an organic radical derived from a monocyclic or polycyclic aromatic heterocycle by removing a hydrogen atom. Non-limiting examples of the heteroaryl group include furyl, thienyl, pyrrolyl, indolyl, indolizinyl, isoindolyl, pyrazolyl, imidazolyl, thiazolyl, thiadiazolyl, benzothiazolyl, 1,2,4-triazolyl, 1,2,3-triazolyl, indazolyl, benzotriazolyl, benzimidazolyl, indazolyl carbazolyl, carbolinyl, benzofuranyl, isobenzofuranyl benzothiophenyl, dibenzofuranyl, dibenzothiophenyl, isothiazolyl, isoxazolyl, pyridyl, purinyl, pyridazinyl, pyrimidinyl, pyrazinyl, triazinyl, tetrazinyl, petazinyl, quinolinyl, isoquinolinyl, perimidinyl, cinnolinyl, phthalazinyl, quinazolinyl, quinoxalinyl, naphthyridinyl, acridinyl, phenanthridinyl, phenanthrolinyl, anthyridinyl, purinyl, pteridinyl, alloxazinyl, phenazinyl, phenothiazinyl, phenoxazinyl, phenoxathiinyl, dibenzo(1,4)dioxinyl, and thianthrenyl. A heteroaryl group can be unsubstituted or substituted with one or more suitable substituents. Furthermore, the heteroaryl group can be monocyclic or polycyclic.

As used herein and unless otherwise indicated, the term "alkenyl" or "alkenyl group" means a monovalent, unbranched or branched hydrocarbon chain having one or more double bonds therein. The double bond of an alkenyl group can be unconjugated or conjugated to another unsaturated group. Suitable alkenyl groups include, but are not limited to $(C_2-C_8)$alkenyl groups, such as vinyl, allyl, butenyl, pentenyl, hexenyl, butadienyl, pentadienyl, hexadienyl, 2-ethylhexenyl, 2-propyl-2-butenyl, 4-(2-methyl-3-butenyl)-pentenyl. An alkenyl group can be unsubstituted or substituted with one or two suitable substituents. Furthermore, the alkenyl group can be branched or unbranched.

As used herein and unless otherwise indicated, the term "alkynyl" or "alkynyl group" means monovalent, unbranched or branched hydrocarbon chain having one or more triple bonds therein. The triple bond of an alkynyl group can be unconjugated or conjugated to another unsaturated group. Suitable alkynyl groups include, but are not limited to, $(C_2-C_8)$alkynyl groups, such as ethynyl, propynyl, butynyl, pentynyl, hexynyl, methylpropynyl, 4-methyl-1-butynyl, 4-propyl-2-pentynyl, and 4-butyl-2-hexynyl. An alkynyl group can be unsubstituted or substituted with one or two suitable substituents. Furthermore, the alkynyl group can be branched or unbranched.

As used herein and unless otherwise indicated, the term "heterocyclic" or "heterocyclic group" means any monocyclic or polycyclic (e.g., bicyclic, tricyclic, etc.) ring compound having at least a heteroatom (e.g., O, S, N, P, B, Si, etc.) in the ring. The heterocyclic group may be aromatic or non-aromatic.

As used herein and unless otherwise indicated, the term "substituted" as used to describe a compound or chemical moiety means that at least one hydrogen atom of that compound or chemical moiety is replaced with a second chemical moiety. The second chemical moiety can be any desired substituent that does not adversely affect the desired activity of the compound. Examples of substituents are those found in the exemplary compounds and embodiments disclosed herein, as well as halogen; alkyl; heteroalkyl; alkenyl; alkynyl; aryl; heteroaryl; hydroxyl; alkoxyl; amino; nitro; thiol; thioether; imine; cyano; amido; phosphonato; phosphine; carboxyl; thiocarbonyl; sulfonyl; sulfonamide; ketone; aldehyde; ester; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); —O-lower alkyl; —O-aryl, aryl; aryl-lower alkyl; —CO$_2$CH$_3$; —CONH$_2$; —OCH$_2$CONH$_2$; —NH$_2$; —SO$_2$NH$_2$; —OCHF$_2$; —CF$_3$; —OCF$_3$; —NH(alkyl); —N(alkyl)$_2$; —NH(aryl); —N(alkyl)(aryl); —N(aryl)$_2$; —CHO; —CO(alkyl); —CO(aryl); —CO$_2$(alkyl); and —CO$_2$(aryl); and such moieties can also be optionally substituted by a fused-ring structure or bridge, for example —OCH$_2$O—. These substituents can optionally be further substituted with a substituent selected from such groups. All chemical groups disclosed herein can be substituted, unless it is specified otherwise.

Flame retardant compositions having improved flammability characteristics can be formulated by adding at least a flame retardant of Formula (I) to at least a polymer. Non-limiting examples of polymers include polycarbonates (PC), poly(phenylene oxide) (PPO), polyesters (e.g., PET and PBT), acrylonitrile-butadiene-styrene terpolymer (ABS), high-impact polystyrene (HIPS), polyarylates, and combinations or blends thereof such as the polycarbonate and acrylonitrile-butadiene-styrene terpolymer (PC/ABS) blend and the poly(phenylene oxide) and high-impact polystyrene (PPO/HIPS) blend. In some embodiments, the flame retardant compositions further comprise at least a second flame retardant known in the art such as phosphate esters (e.g., RDP), alumina trihydrate, magnesium hydroxide, halogenated compounds, antimony oxide, melamine derivatives, and boric acid and other boron compounds. In other embodiments, the flame retardant compositions are substantially free of a second flame retardant known in the art, which can be selected from the group consisting of phosphate esters, alumina trihydrate, magnesium hydroxide, halogenated compounds, antimony oxide, melamine derivatives, boric acid and other boron compounds, and combinations thereof. As used herein and unless otherwise indicated, a composition that is "substantially free" of a compound or an additive means that the composition contains less than about 20% by weight, more preferably less than about 10% by weight, even more preferably less than about 5% by weight, and most preferably less than about 3% by weight of the compound or the additive.

Optionally, the flame retardant compositions can further comprise at least one additive such as extenders, fibers, fillers, coupling agents, cross-linking agents, plasticizers, impact modifiers, compatibilizers, anti-blocking agents, anti-fogging agents, anti-aging agents, antioxidants, UV stabilizers, antiozonants, acid scavengers, processing aids, surfactants, lubricants, plasticizing agents, parting agents and abherents, nucleating agents, anti-static agents, slip agents, chemical blowing agents, fluorescent whitening agents, flow agents, deodorants, release agents, colorants such as dye and pigments, and anti-microbials such as bactericides. Some of the above-mentioned additives are described in Zweifel, et al., "*Plastics Additives Handbook*," Hanser Gardner Publications, Cincinnati, Ohio, 5th edition (2001); John Murphy, "*Additives for Plastics Handbook*," Elsevier Science Pub. Co., New York, N.Y., 2nd edition (2001), both of which are incorporated herein by reference in their entirety. In some embodiments, the flame retardant compositions are substantially free of an additive.

The flame retardant compositions can be used to prepare articles by known polymer processes such as extrusion, injection molding, rotational molding, and molding. In general, extrusion is a process by which a polymer is propelled continuously along a screw through regions of high temperature and pressure where it is melted and compacted, and finally forced through a die. The extrusion of polymers is described in C. Rauwendaal, "*Polymer Extrusion*", Hanser Publishers, New York, N.Y. (1986); and M. J. Stevens, "*Extruder Principals and Operation*," Elsevier Applied Science Publishers, New York, N.Y. (1985), both of which are incorporated herein by reference in their entirety.

Injection molding is also widely used for manufacturing a variety of plastic parts for various applications. In general, injection molding is a process by which a polymer is melted and injected at high pressure into a mold, which is the inverse of the desired shape, to form parts of the desired shape and size. The mold can be made from metal, such as steel and aluminum. The injection molding of polymers is described in Beaumont et al., "*Successful Injection Molding: Process, Design, and Simulation*," Hanser Gardner Publications, Cincinnati, Ohio (2002), which is incorporated herein by reference in its entirety.

Molding is generally a process by which a polymer is melted and led into a mold, which is the inverse of the desired shape, to form parts of the desired shape and size. Molding can be pressureless or pressure-assisted. The molding of polymers is described in Hans-Georg Elias "*An Introduction to Plastics*," Wiley-VCH, Weinhei, Germany, pp. 161-165 (2003), which is incorporated herein by reference.

Rotational molding is a process generally used for producing hollow plastic products. By using additional post-molding operations, complex components can be produced as effectively as other molding and extrusion techniques. Rotational molding differs from other processing methods in that the heating, melting, shaping, and cooling stages all occur after the polymer is placed in the mold, therefore no external pressure is applied during forming. The rotational molding of polymers is described in Glenn Beall, "*Rotational Molding: Design, Materials & Processing*," Hanser Gardner Publications, Cincinnati, Ohio (1998), which is incorporated herein by reference in its entirety.

In general, any article that comprises a polymer can be prepared with a flame retardant composition which contains the polymer and at least a flame retardant of Formula (I). Non-limiting examples of useful articles include plastic products, textiles, wood and paper products, adhesives and sealants, and rubber products, aerospace parts, automotive parts, wires, cables, construction materials, materials for interiors and furnishings, appliances, electronic components, computers, and business machines. In some embodiments, the articles are prepared by extrusion of the flame retardant composition. In other embodiments, the articles are prepared by injection molding of the flame retardant composition. In further embodiments, the articles are prepared by molding of the flame retardant composition. In additional embodiments, the articles are prepared by rotational molding of the flame retardant composition.

In some embodiments, the flame retardant having Formula (I) can be prepared by reacting a resorcinol carbonate compound having the formula:

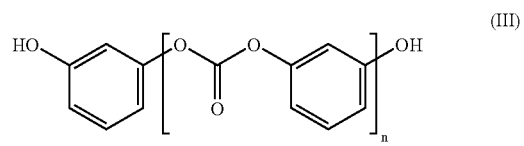

(III)

with a chlorophosphate having the formula:

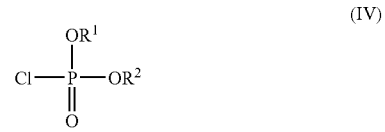

(IV)

in the presence of a catalyst or an acid acceptor, wherein n is an integer between 1 and 10; and each of $R^1$ and $R^2$ is independently alkyl, alkenyl, alkynyl, heteroalkyl, aryl, heteroaryl, cycloalkyl, or heterocycloalkyl, or a part of a heterocyclic group when $R^1$ and $R^2$ form the heterocyclic group together with the —O—P(=O)(—Cl)—O— fragment. Each of the alkyl, alkenyl, alkynyl, heteroalkyl, aryl, heteroaryl, cycloalkyl, heterocycloalkyl, and heterocyclic group can be substituted or unsubstituted. The details of the reaction are discussed below.

As used herein and unless otherwise indicated, the term "reacting" or the like means contacting one reactant, reagent, solvent, catalyst, reactive group or the like with another reactant, reagent, solvent, catalyst, reactive group or the like. Reactants, reagents, solvents, catalysts, reactive group or the like can be added individually, simultaneously or separately and can be added in any order. They can be added in the presence or absence of heat and can optionally be added under an inert atmosphere. "Reacting" can refer to in situ formation or intramolecular reaction where the reactive groups are in the same molecule.

The phosphorylation of Formula (III) with Formula (IV) can be promoted by either a catalyst such as magnesium chloride or an acid acceptor. The phosphorylation can occur in a solvent, preferably an inert organic solvent which does not react with the chloro group of the compound of Formula (IV). Non-limiting examples of suitable inert organic solvents include aromatic hydrocarbons (e.g., toluene, benzene, and xylene), methylene chloride, chloroform, acetonitrile, ethers, ketones, dimethylformamide, trichloroethane, tetrahydrofuran, tetrachloroethylene, chlorobenzene and combinations thereof. In some embodiments, the solvent is toluene or methylene chloride.

Any phosphorylation catalyst known by a person of ordinary skill in the art can be used for the reaction between Formula (III) with Formula (IV). Non-limiting examples of phosphorylation catalysts include magnesium chloride, aluminum trichloride, titanium tetrachloride, and zinc dichloride. In some embodiments, the solvent for the magnesium chloride-catalyzed phosphorylation is toluene and the reaction temperature is greater than about 35° C., preferably greater than about 55° C., more preferably greater than about 75° C., and most preferably greater than about 100° C. The reaction product can be purified by washing the reaction mixture after completion with water or a basic aqueous solution such as sodium hydroxide solution, sodium carbonate solution, sodium bicarbonate solution, or potassium hydroxide solution. The amount of the catalyst can be in the range from 0.1 wt % to 10 wt % based on the total weight of the reactants. The reaction temperature can be greater than 25° C., greater than 50° C., greater than 75° C., greater than 100° C., greater than 120° C., greater than 140° C., or greater than 150° C.

Any compound that can neutralize hydrogen chloride can be used for the reaction Formula (III) with Formula (IV). The acid acceptor can be an organic base. Non-limiting examples of suitable organic bases include amines (e.g., trimethylamine, triethylamine, N,N-diisopropylethylamine, triphenylamine, 1,8-diazabicyclo[5.4.0]undec-7-ene), 1-alkylpiperidines such as 1-ethylpiperidine, 1-alkylpyrrolidines such as 1-methylpyrrolidine, pyridine, and combinations thereof. Other suitable amines include, but not limited to, trialkylamines such as tributylamine, trioctylamine, trinonylamine, tridecylamine, triundecylamine, tridodecylamine, tri(tridecyl)amine, tripentadecylamine, trihexadecylamine, triheptadecylamine, trioctadecylamine, trinonadeclyamine, trieicosylamine, tri(tetrachlorododecyl)amine, trihexachloroheptadecylamine, lower alkyl substituted derivatives of pyridine (such as 2,6-lutidine and 2,4,6-collidine), 2,2,6,6-N-pentamethylpiperidine, N,N-dimethylaniline, and diisopropyl-N-ethylamine or combinations thereof. In some embodiments, the acid acceptor is triethylamine. In other embodiments, the solvent for the triethylamine-promoted phosphorylation is methylene chloride and the reaction temperature is less than about 50° C., preferably less than about 35° C., and more preferably between about 20° C. and about 25° C. The amount of the acid acceptor can be in the range from 1.0 to 1.5 mole per mole of chlorophosphate of formula (IV).

The mole ratio of the chlorophosphate of Formula (V) to the resorcinol carbonate compound of Formula (III) can be greater than about 10:1, greater than about 8:1, greater than about 6:1, greater than about 5:1, greater than about 4:1, greater than about 3:1, or greater than or equal to 2:1. In a particular embodiment, the mole ratio of the chlorophosphate of Formula (V) to the resorcinol carbonate compound of Formula (III) is greater than or equal to 2:1. In some embodiments where an excess of either the resorcinol carbonate compound of Formula (III) or the chlorophosphate of Formula (IV) is used, the excess unreacted reactant can be extracted or separated out with a combination of water and/or an aqueous basic solution and/or an acidic solution.

The chlorophosphate of Formula (IV) can be any chlorophosphate that can react with the aromatic hydroxyl groups of the compound of Formula (III). Non-limiting examples of suitable chlorophosphates of Formula (IV) include 2-chloro-2-oxo-1,3,2-dioxaphospholane, dimethyl chlorophosphate, diethyl chlorophosphate, 2-chloro-5,5-dimethyl-1,3,2-dioxaphophorinane-2-oxide, o-phenylene phosphorochloridate, diphenyl chlorophosphate, bis(2-methylphenyl) chlorophosphate, bis(4-methylphenyl) chlorophosphate, bis(3,5-dimethylphenyl) chlorophosphate, bis(2,6-dimethylphenyl) chlorophosphate, bis(2,4-dichlorophenyl) chlorophosphate, and bis[2-(4-nitrophenyl)ethyl] chlorophosphate, all of which are available from a commercial supplier such as Aldrich Chemicals, Milwaukee, Wis. In a particular embodiment, the chlorophosphate of Formula (IV) is diphenyl chlorophosphate.

In some embodiments, n of Formula (I) is 1 and each of $R^1$ and $R^2$ of Formula (I) is independently a substituted or unsubstituted phenyl group. The preparation of which is shown below in Scheme A.

Scheme A

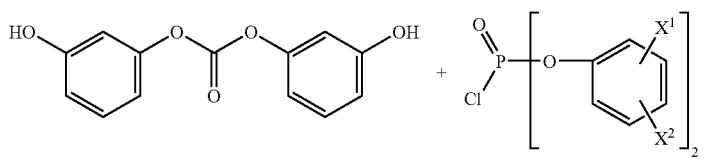

Formula (III) where
n = 1

Formula (IV) where
$R^1, R^2 = C_6H_3X^1X^2$;
n = 1, and $X^1$ and $X^2$ = H or alkyl catalyst
or acid
acceptor -continued

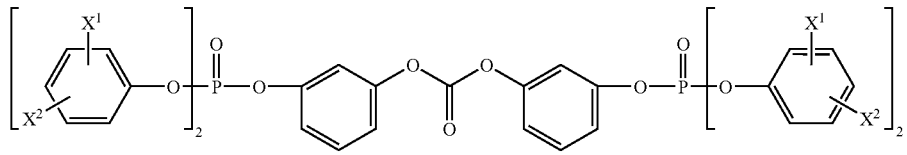

Formula (I) where R¹, R² = C₆H₃X¹X²;
n = 1, and X¹ and X² = H or alkyl

Alternatively, the flame retardant having Formula (I) can be prepared by reacting a bis-(dichloro)phosphate compound having the formula:

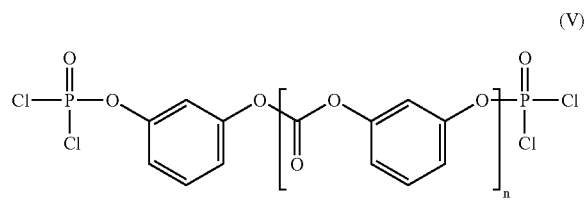

(V)

with at least a hydroxyl compound in the presence of a catalyst or acid acceptor, wherein n is an integer between 1 and 10.

Any phosphorylation catalyst known by a person of ordinary skill in the art can be used for the reaction between Formula (V) and the hydroxyl compound. Non-limiting examples of phosphorylation catalysts include magnesium chloride, aluminum trichloride, titanium tetrachloride, and zinc dichloride. The reaction product can be purified by washing the reaction mixture after completion with water or a basic aqueous solution such as sodium hydroxide solution, sodium carbonate solution, sodium bicarbonate solution, or potassium hydroxide solution. The amount of the catalyst can be in the range from 0.1 wt % to 10 wt % based on the total weight of the reactants. The reaction temperature can be greater than 25° C., greater than 50° C., greater than 75° C., greater than 100° C., greater than 120° C., greater than 140° C., or greater than 150° C.

Any compound that can neutralize hydrogen chloride can be used as an acid acceptor for the reaction between Formula (V) and the hydroxyl compound. The acid acceptor can be an organic base. In some embodiments, the acid acceptor is an amine (e.g., trimethylamine, triethylamine, N,N-diisopropylethylamine, triphenylamine, 1,8-diazabicyclo[5.4.0]undec-7-ene), 1-alkylpiperidines such as 1-ethylpiperidine, 1-alkylpyrrolidines such as 1-methylpyrrolidine, pyridine and combinations thereof. Other suitable amines include, but not limited to, trialkylamines such as tributylamine, trioctylamine, trinonylamine, tridecylamine, triundecylamine, tridodecylamine, tri(tridecylamine), tripentadecylamine, trihexadecylamine, triheptadecylamine, trioctadecylamine, trinonadeclyamine, trieicosylamine, tritetrachlorododecylamine, trihexachloroheptadecylamine, lower alkyl substituted derivatives of pyridine (such as 2,6-lutidine and 2,4,6-collidine), 2,2,6,6-N-pentamethylpiperidine, N,N-dimethylaniline, and diisopropyl-N-ethylamine or combinations thereof. The amount of the acid acceptor can be between about 1.0 to 1.5 mole per mole of hydroxyl functionality in a compound.

The reaction may occur in the presence of a solvent, preferably an inert organic solvent which does not react with the chloro groups of the bis-(dichloro)phosphate groups of the compound of Formula (V). Non-limiting examples of suitable inert organic solvents include aromatic hydrocarbons (e.g., toluene, benzene, and xylene), methylene chloride, chloroform, acetonitrile, ethers, ketones, and combinations thereof. In some embodiments, the solvent is toluene or methylene chloride.

The hydroxyl compound can be a mono-hydroxyl compound or a polyol such as diols, triols, tetraols, etc. In some embodiments, the hydroxyl compound is a mono-hydroxyl compound. Non-limiting examples of suitable mono-hydroxyl compounds include mono-hydroxyl aromatic alcohols such as phenol, 2-methylphenol, 4-methylphenol, 3,5-dimethylphenol, 2,4-dichlorophenol, and mono-hydroxyl aliphatic alcohols such as 2-(4-nitrophenyl)ethanol, methanol, and ethanol, all of which can be obtained from a commercial supplier such as Aldrich Chemicals, Milwaukee, Wis. The mole ratio of the mono-hydroxyl compound to the bis-(dichloro)phosphate compound of Formula (V) can be greater than about 1000:1, greater than about 100:1, greater than about 10:1, greater than about 9:1, greater than about 8:1, greater than about 7:1, greater than about 6:1, greater than about 5:1, or greater than or equal to 4:1. In other embodiments, the hydroxyl compound is a diol. The diol can react with the dichlorophosphate groups of Formula (V) to form heterocyclic rings containing the —O—P(=O)(—O—)—O— fragment. Non-limiting examples of suitable diols include 1,2-dihydroxybenzene, 4-methyl-1,2-benzenediol, 3-methyl-1,2-benzenediol, 3-fluoro-1,2-benzenediol, 4-chloro-1,2-benzenediol, 3,4-dihydroxybenzonitrile, 3,4-dihydroxybenzaldehyde, 3-methoxy-1,2-benzenediol, 1,3-propanediol, 2,2-dimethyl-1,3-propanediol, 2-ethyl-2-methyl-1,3-propanediol, and ethylene glycol, all of which can be obtained from a commercial supplier such as Aldrich Chemicals, Milwaukee, Wis. The mole ratio of the diol to the bis-(dichloro)phosphate compound of Formula (V) can be between greater than about 1000:1, greater than about 100:1, greater than about 10:1, greater than about 9:1, greater than about 8:1, greater than about 7:1, greater than about 6:1, greater than about 5:1, greater than about 4:1, greater than about 3:1, or greater than or equal to 2:1.

The bis-(dichloro)phosphate compound of Formula (V) can be prepared by reacting the resorcinol carbonate compound of Formula (III) with phosphorus oxychloride (POCl₃) in the presence of a catalyst such as magnesium chloride or an acid acceptor. In one embodiment, n of Formula (III) is 1 and each of R¹ and R² is independently H or alkyl, as shown in Scheme B below.

Scheme B

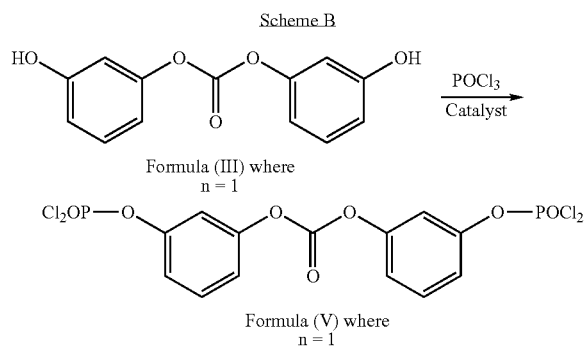

Formula (III) where n = 1

Formula (V) where n = 1

The reaction between the resorcinol carbonate compound of Formula (III) and phosphorus oxychloride can occur in an inert organic solvent such as aromatic hydrocarbons (e.g., toluene, benzene, and xylene), methylene chloride, chloroform, acetonitrile, ethers, and ketones. The preferred solvent is toluene or methylene chloride. In one embodiment, the solvent is methylene chloride. In another embodiment, the solvent is toluene.

Any phosphorylation catalyst known by a person of ordinary skill in the art can be used for the reaction between Formula (III) and phosphorus oxychloride. Non-limiting examples of phosphorylation catalysts include magnesium chloride, aluminum trichloride, titanium tetrachloride, and zinc dichloride. The reaction product can be purified by washing the reaction mixture after completion with water or a basic aqueous solution such as sodium hydroxide solution, sodium carbonate solution, sodium bicarbonate solution, or potassium hydroxide solution. The amount of the catalyst can be in the range from 0.1 wt % to 10 wt % based on the total weight of the reactants. The reaction temperature can be greater than 25° C., greater than 50° C., greater than 75° C., greater than 100° C., greater than 120° C., greater than 140° C., or greater than 150° C.

Any compound that can neutralize hydrogen chloride can be used as an acid acceptor for the reaction between Formula (III) and phosphorus oxychloride. The acid acceptor can be an organic base. In some embodiments, the acid acceptor is an amine (e.g., trimethylamine, triethylamine, N,N-diisopropylethylamine, triphenylamine, 1,8-diazabicyclo[5.4.0]undec-7-ene), 1-alkylpiperidines such as 1-ethylpiperidine, 1-alkylpyrrolidines such as 1-methylpyrrolidine, pyridine and combinations thereof. Other suitable amines include, but not limited to, trialkylamines such as tributylamine, trioctylamine, trinonylamine, tridecylamine, triundecylamine, tridodecylamine, tri(tridecylamine), tripentadecylamine, trihexadecylamine, triheptadecylamine, trioctadecylamine, trinonadeclyamine, trieicosylamine, tritetrachlorododecylamine, trihexachloroheptadecylamine, lower alkyl substituted derivatives of pyridine (such as 2,6-lutidine and 2,4,6-collidine), 2,2,6,6-N-pentamethylpiperidine, N,N-dimethylaniline, and diisopropyl-N-ethylamine or combinations thereof. The amount of the acid acceptor can be between about 1.0 to 1.5 mole per mole of hydroxyl functionality in a compound. In further embodiments, the reaction temperature is less than 50° C., preferably less than 35° C., and more preferably between about 20° C. and about 25° C.

The mole ratio of $POCl_3$ to the resorcinol carbonate of Formula (III) can be greater than about 100:1, greater than about 50:1, greater than about 10:1, greater than about 8:1, greater than about 6:1, greater than about 5:1, greater than about 4:1, greater than about 3:1, or greater than or equal to 2:1. In a particular embodiment, the mole ratio of $POCl_3$ to the resorcinol carbonate of Formula (III) is greater than or equal to 2:1. In some embodiments where n of the resorcinol carbonate compound of Formula (III) is 1, the mole ratio of $POCl_3$ to the resorcinol carbonate of Formula (III) is greater than or equal to 2:1. In other embodiments where an excess of the resorcinol carbonate compound of Formula (III) or $POCl_3$ is used, the excess unreacted reactant can be extracted or separated out with an aqueous basic solution or water.

Synthesis of Resorcinol Carbonate Compounds of Formula (III)

The resorcinol carbonate compounds of Formula (III) or resorcinol carbonates (RC) can be synthesized by the reaction of resorcinol with either (i) phosgene ($COCl_2$) or (ii) diphenyl carbonate according to Scheme C below.

Scheme C

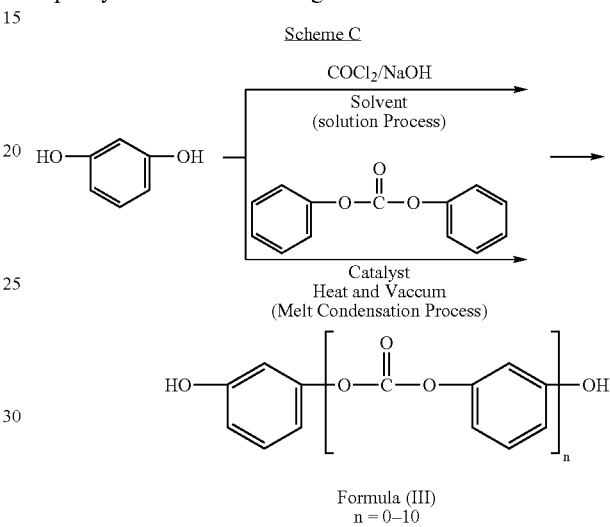

Formula (III)
n = 0–10

The first route is the solvent process in which resorcinol can react with phosgene ($COCl_2$) in a solvent to form the resorcinol carbonate compound of Formula (III). The mole ratio of resorcinol to phosgene can be between about 3:1 and about 1:1, or about 2.5:1 and about 1.5:1, preferably about 2:1. The solvent can be an inert organic solvent, preferably an inert organic solvent which does not react with phosgene. Non-limiting examples of suitable inert organic solvents include aromatic hydrocarbons (e.g., toluene, benzene, and xylene), methylene chloride, chloroform, acetonitrile, ethers, ketones, and combinations thereof. In some embodiments, the solvent is toluene or methylene chloride. The reaction may occur in the presence of bases, such as organic bases and alkali metal hydroxides, bicarbonates or carbonates. In some embodiments, the base is sodium hydroxide, potassium hydroxide, sodium carbonate, or potassium carbonate. The amount of the base relative to phosgene can be between about 3:1 and about 2:1, preferably about 2:1.

The second route is the melt condensation process in which resorcinol reacts with a carbonate compound in the presence of a catalyst to form the resorcinol carbonate compound of Formula (III) or RC. Non-limiting examples of suitable carbonate compounds include diphenyl carbonate, bis(4-methylphenyl) carbonate, bis(2-methylphenyl) carbonate, di(1-naphthyl) carbonate, dimethyl carbonate, and diethyl carbonate, all of which can be obtained from a commercial supplier such as Aldrich Chemicals, Milwaukee, Wis. The melt condensation can be used to prepare monomeric, oligomeric or polymeric aromatic carbonate compounds from the reaction of an aromatic dihydroxy compound with diphenyl carbonate in the presence or absence of a catalyst. In some embodiments, the aromatic dihydroxy compound is resorcinol, hydroquinone, bisphenol-A, bisphenol-F, bisphenol-C or biphenols. Resorcinol can be employed in the presence or absence of other aromatic dihydroxy compounds to obtain resorcinol carbonate materials. In polycarbonate polymers, the presence of resorcinol carbonate structure was found to improve the melt flow properties. The flame retardants of Formula (I), which can be used as flame retardants in polymers and in other non-flame retardant applications, have not been reported in the literature before. Such flame retardants of Formula (I) having both carbonate and phosphate ester groups can enhance their compatibility with and the flammability rating of polymers such as polycarbonates (PC), poly(phenylene oxide) (PPO), polyesters (e.g., PET and PBT), polycarbonate and acrylonitrile-butadiene-styrene terpolymer (PC/ABS) blends, poly(phenylene oxide) and high-impact polystyrene (PPO/HIPS) blends and other polymers.

In some embodiments, the catalyst for making resorcinol carbonates of Formula (III) can be selected from the group consisting of organic bases, triphenylphosphine, quaternary ammonium hydroxides such as tetramethylammonium hydroxide, metal hydroxides such as sodium hydroxide and potassium hydroxide, and combinations thereof. Non-limiting examples of suitable organic bases include amines (e.g., trimethylamine, triethylamine, N,N-diisopropylethylamine, 1,8-diazabicyclo[5.4.0]undec-7-ene, triphenylamine, aniline), 1-alkylpiperidines such as 1-ethylpiperidine, 1-alkylpyrrolidines such as 1-methylpyrrolidine, pyridine, imidazole, and combinations thereof. The amount of the catalyst can be between about 0.0001 mole % and about 5 mole % based on resorcinol, preferably between about 0.001 mole % and about 1 mole %.

The mole ratio of resorcinol to the carbonate compound can be between about 3:1 and about 1:3, preferably between about 2.5:1 and about 1:2, more preferably between about 2.25:1 and about 1.5:1, most preferably between about 2.2:1 and about 2:1. In some embodiments, a ratio of 2.1 mole resorcinol to 1 mole diphenyl carbonate is used to produce a product containing a mixture of compounds having primarily the resorcinol monocarbonate ester structures (i.e., n is 1) and resorcinol dicarbonate ester structures (i.e., n is 2), along with some unreacted resorcinol (i.e., n is 0). Optionally, the unreacted resorcinol can be removed by conventional techniques such as distillation and extraction. The reaction was performed such that the vacuum and temperature are gradually increased to drive the reaction to substantially completion and to distill off the phenol by-product. The reaction temperatures can range from 170 to 250° C. and the vacuum pressure can range from 1 to 29 inches of Hg, preferably from 22 to 28 inches of Hg. As used herein and unless otherwise indicated, a reaction that is "substantially complete" or is driven to "substantial completion" means that the reaction contains more than about 80% by percent yield, more preferably more than about 90% by percent yield, even more preferably more than about 95% by percent yield, and most preferably more than about 97% by percent yield of the desired product.

For both the solvent process and the melt condensation process, resorcinol carbonate compounds of Formula (III) with varying molecular weights or varying n values can be synthesized, depending upon, inter alia, the reaction conditions (e.g., reaction temperature, pressure, and time), the ratio of reactants, and the concentration of catalyst. Irrespective of the methods used in the resorcinol carbonate synthesis, the resulting reaction product containing the carbonate group(s) in the main chain or backbone can be used in the synthesis of the flame retardants of Formula (I).

Scheme D below illustrates one embodiment of this invention where each of $R^1$ and $R^2$ of Formula (I) is phenyl and n of Formula (I) or (III) is an integer between 1 and 10. In some embodiments, Formula (III) contains some unreacted resorcinol. In other embodiments, Formula (I) contains some phosphate ester derived from the unreacted resorcinol in Formula (III), i.e., n is 0.

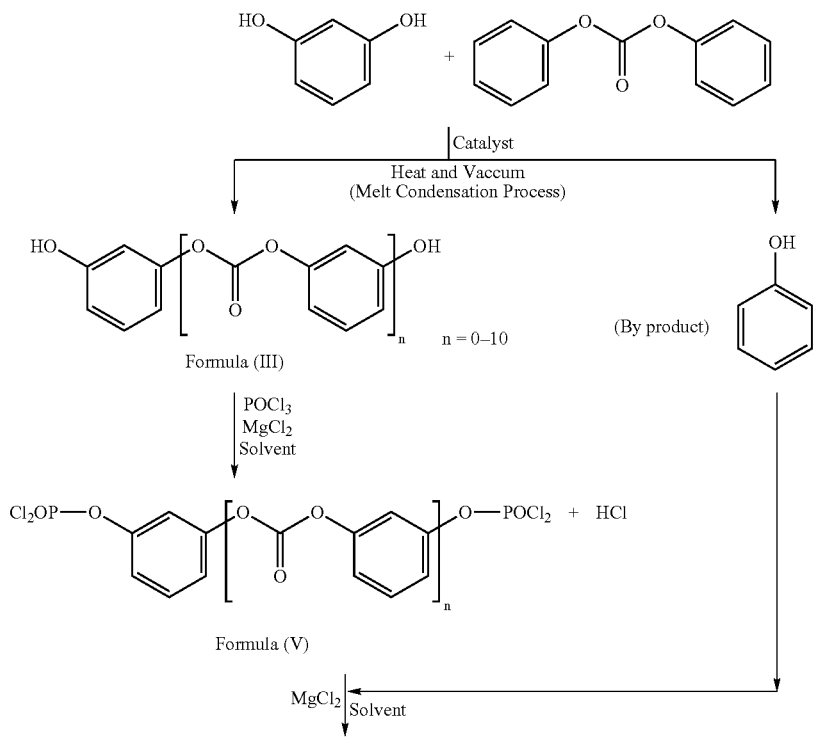

Scheme D

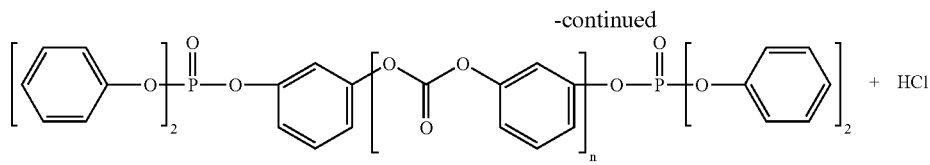

Formula (I) where each of $R^1$ and $R^1$ is phenyl.

The skilled artisan will recognize that the phenol by-product obtained from the process shown in Scheme D can be efficiently recycled either to produce the diphenyl carbonate starting material or used with the bis-(dichloro) phosphate compound shown in Scheme D to make the phosphate ester compounds. Optionally, the unreacted resorcinol (i.e., Formula (III) where n is 0) or its phosphorus derivatives (i.e., Formula (I) and Formula (V) where n is 0) can be removed by conventional techniques such as distillation or extraction.

In addition to resorcinol, all the aromatic dihydroxy compounds capable of forming carbonate groups with phosgene or diphenyl carbonate can be used. Suitable dihydroxy compounds are hydroquinone, bisphenol-A, bisphenol-F, bisphenol-C and biphenols.

Based on the disclosure herein, a person of ordinary skill in the art can recognize that other carbonate-based phosphate esters, in addition to those represented by Formula (I), can be obtained from other aromatic compounds having at least two aromatic hydroxy groups such as hydroquinone, 1,2-dihydroxybenzene, 1,2,3-trihydroxybenzene, 1,2,4-trihydroxybenzene, 1,3,5-trihydroxybenzene, bisphenol-A, bisphenol-F, bisphenol-C and biphenols. For example, hydroquinone carbonate-based phosphate esters (VI) can be obtained according to the preparation procedure for the resorcinol carbonate-based phosphate esters disclosure herein except that resorcinol is replaced with hydroquinone.

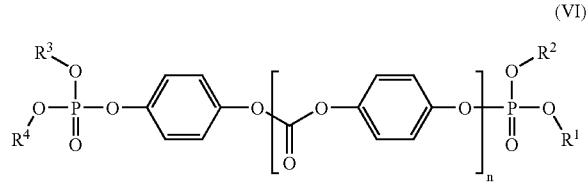

(VI)

The following examples are presented to exemplify embodiments of the invention. All numerical values are approximate. When numerical ranges are given, it should be understood that embodiments outside the stated ranges may still fall within the scope of the invention. Specific details described in each example should not be construed as necessary features of the invention.

EXAMPLES

Resorcinol Carbonate Synthesis

Example 1

Resorcinol (462.4 grams; 4.2 moles) and diphenyl carbonate (428.4 grams; 2.0 moles) were placed in a 2 L resin kettle with a mechanical stirrer, a thermometer, a distillation head with a Vigreux column, a vacuum takeoff, a receiver, and a heating mantle. The reaction mixture was heated to 115° C. under a $N_2$ sweep. The system was purged by pulling a vacuum of 10 inches of mercury (Hg) followed by a $N_2$ sweep. The above purging step was repeated twice. The catalyst, 1-ethylpiperidine (575 μL, 0.475 grams, 0.0042 mole), was added to the reaction mixture via a syringe. The temperature was gradually increased to a maximum temperature of 170° C., and at the same time the vacuum pressure was gradually reduced to about 20 mm of Hg. The rate of these increases was controlled to maintain a steady distillation of the by-product, i.e., phenol. The reaction was stopped when phenol distillation ceased (approximately 4 hours total). The product (511.6 grams) was an amber semi-solid. This material had a hydroxyl number of 455 and a number average molecular weight of 231±7. A C-13 NMR analysis indicated the presence of resorcinol mono-carbonate structure, resorcinol dicarbonate structure and free resorcinol, which corresponded to the formation of desired resorcinol carbonate compounds proposed in Scheme B.

Example 2

Resorcinol (73.8 grams; 0.67 mole) and diphenyl carbonate (68.5 grams; 0.32 mole) were placed in a 250 mL round-bottom flask with a mechanical stirrer, a thermometer, a distillation head with a Vigreux column, a vacuum takeoff, a receiver, and a heating mantle. The reaction mixture was heated to 110° C. under a $N_2$ sweep. The system was purged by pulling a vacuum of 10 inches of mercury (Hg) followed by a $N_2$ sweep. The above purging step was repeated twice. The catalyst, 1-ethylpiperidine (1 μL, $7.6 \times 10^{-4}$ grams, $6.7 \times 10^{-6}$ mole), was added to the reaction mixture via a syringe. The temperature was gradually increased to a maximum temperature of 200° C. while the vacuum pressure was simultaneously increased to 25 inches of Hg. The rate of these increases was controlled to maintain a steady distillation of the by-product, i.e., phenol. The reaction was stopped when phenol distillation ceased (approximately 3 hours total). The product (89.1 grams) was a clear gold semi-solid. A C-13 NMR analysis indicated the presence of resorcinol mono-carbonate structure, resorcinol dicarbonate structure and free resorcinol, which corresponded to the formation of desired resorcinol carbonate compounds proposed in Scheme B.

Example 3

Resorcinol (73.8 grams, 0.67 mole), diphenyl carbonate (68.5 grams, 0.32 mole), and triphenylphosphine (0.74 grams) were placed in a 250 mL round-bottom flask with a mechanical stirrer, a thermometer, a distillation head with a Vigreux column, a vacuum takeoff, a receiver, and a heating mantle. The reaction mixture was heated to 106° C. under a $N_2$ sweep. The system was purged by pulling a vacuum of 10 inches of mercury (Hg) followed by a $N_2$ sweep. The above purging step was repeated twice. The temperature was gradually increased to a maximum temperature of 200° C. while the vacuum pressure was simultaneously increased to about 125 mm of Hg. The rate of these increases was controlled to maintain a steady distillation of the by-product, i.e., phenol. The reaction was stopped when phenol distillation ceased (approximately 4 hours total). The product (81.7 grams) was a dark gold semi-solid. A C-13 NMR analysis confirmed the presence of resorcinol mono-carbonate structure and resorcinol dicarbonate structure, and also free resorcinol, which corresponded to the formation of desired resorcinol carbonate compounds proposed in Scheme B.

Example 4

Diphenyl carbonate (85.7 grams; 0.4 mole) was placed in a 250 mL round-bottom flask with a mechanical stirrer, a thermometer, a distillation apparatus, a vacuum takeoff, a receiver, and a heating mantle. The reaction mixture was heated to 85° C. under a $N_2$ sweep. Resorcinol (92.5 grams; 0.84 mole) was added to the flask. The system was heated to 115° C. and 25.5 wt % tetramethylammonium hydroxide solution (0.3 grams) and 25 wt % sodium hydroxide solution (0.13 grams) were added. The temperature was gradually increased to a maximum temperature of 200° C. while the vacuum was simultaneously increased to 22" of Hg. The rate of these increases was controlled to maintain a steady distillation of the by-product, i.e., phenol. The reaction was stopped when phenol distillation ceased (approximately 2.5 hours total). The product (117.1 grams) was a dark red semi-solid.

Flame Retardant Synthesis

Resorcinol carbonate-based phosphate ester flame retardants were synthesized by reacting the resorcinol carbonate reaction product (i.e., Examples 1-4) with diphenyl chlorophosphate (DPCP) according to Scheme E below. The reaction was carried out via 2 different routes: (1) a high temperature reaction using $MgCl_2$ as a catalyst and (2) a low temperature reaction using triethylamine as an acid acceptor. The resorcinol carbonate reaction product was also reacted with di(2,6-xylyl) chlorophosphate (DXCP) to produce the corresponding phosphate ester flame retardant via the triethylamine route.

Example 5

A resorcinol carbonate (RC) from a reaction between resorcinol and diphenyl carbonate having a hydroxyl number of 455 (246.6 grams; 1.0 mole), diphenyl chlorophosphate (DPCP) (97.6%; 550.5 grams; 2.0 moles), and toluene (900 mL) were charged in a 2 L round-bottom flask with a mechanical stirrer, a thermometer, a nitrogen port, a reflux condenser, a caustic trap, and a heating mantle. The reaction mixture was stirred under a $N_2$ sweep for 10 minutes. After $MgCl_2$ (6.1 grams) catalyst was added to the reaction mixture, the temperature was increased to 100° C. The temperature was maintained at 100° C. until the evolution of hydrogen chloride (HCl) gas stopped (approximately 18 hour). After toluene (1000 grams) was added, the reaction mixture was washed with 2% sodium hydroxide (NaOH, 200 grams), 1% NaOH (200 grams) and twice with water (200 grams each). Toluene was removed via distillation at 99° C. and under a vacuum of 28 inches of Hg with a rotary vacuum evaporator. The product (669.2 grams) was a pale yellow viscous liquid with a number average molecular weight of 688±30. An FT-IR analysis confirmed the following structural characteristics present in the product: aryl ring, organic carbonate carbonyl (C=O), aryl-O, P=O, P—O—C, and monosubstituted benzene ring. A C-13 NMR analysis indicated C=O carbons and 100 mole % of aromatic C—O—P carbons and 0 mole % C—OH carbons.

Example 6

A resorcinol carbonate (RC) from a reaction between resorcinol and diphenyl carbonate having a hydroxyl number of 469 (239.2 grams; 1.0 mole), diphenyl chlorophosphate (97.6%; 550.5 grams; 2.0 moles), and toluene (900 mL) were charged in a 2 L round-bottom flask with a mechanical stirrer, a thermometer, a nitrogen port, a reflux condenser, a caustic trap, and a heating mantle. The reaction mixture was stirred under a $N_2$ sweep for 10 minutes. After $MgCl_2$ (6.1 grams) was added to the reaction mixture, the reaction temperature was increased to 100° C. The reaction temperature was maintained at 100° C. until the evolution of HCl gas stopped (approximately 12.1 hours). After the reaction mixture was washed 4 times with water, toluene was removed via distillation at 110° C. and under a vacuum of 28 inches of Hg with a rotary vacuum evaporator. The

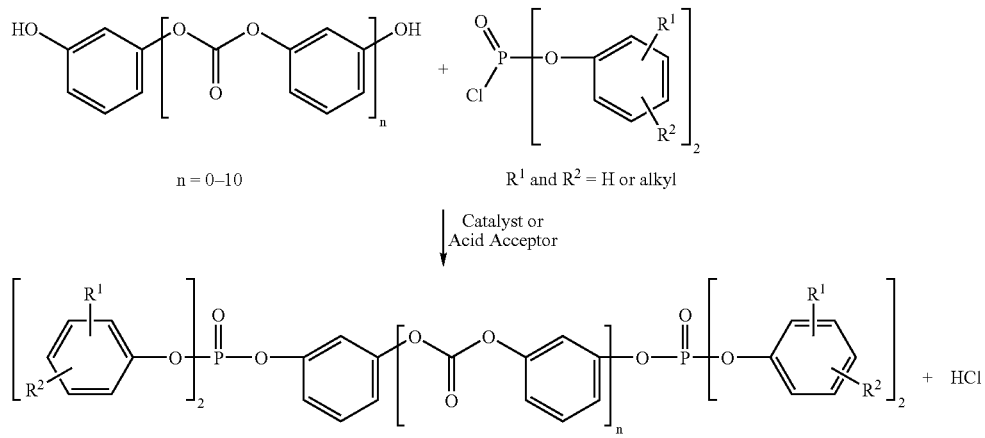

product (705.3 grams) was a light orange-brown viscous liquid. An FT-IR analysis confirmed the following structural characteristics of the product: aryl ring, organic carbonate carbonyl (C=O), aryl-O, P=O, P—O—C, and monosubstituted benzene ring. A C-13 NMR analysis indicated C=O carbons and 100 mole % of aromatic C—O—P carbons and 0 mole % C—OH carbons. The product had a viscosity of 375 cps at 50° C. and a density of 1.31 at 25° C., and contained 9.0 wt % of phosphorus.

Example 7

A resorcinol carbonate (RC) from a reaction between resorcinol and diphenyl carbonate having a hydroxyl number of 469 (7.4 grams; 0.031 mole), diphenyl chlorophosphate (97.6%; 16.8 grams; 0.061 mole), and methylene chloride (100 mL) were charged in a 500 mL round-bottom flask with a mechanical stirrer, a thermometer, an addition funnel, a reflux condenser with a calcium chloride ($CaCl_2$) tube, and a heating mantle. The reaction mixture was stirred at 20-25° C. A solution of triethylamine (6.2 grams, 0.061 mole) dissolved in methylene chloride (50 mL) was added dropwise to the flask for 1 hour at 20-25° C. The reaction temperature was maintained for an additional 3 hours. The reaction mixture was washed with water 5 times at 35° C. The methylene chloride was removed at 95° C. and under a vacuum of 28 inches of Hg with a rotary vacuum evaporator. The product (21.5 grams) was a light yellow viscous liquid. An FT-IR analysis confirmed the following structural characteristics of the product: aryl ring, organic carbonate carbonyl (C=O), aryl-O, P=O, P—O—C, and monosubstituted benzene ring. A C-13 NMR analysis indicated C=O carbons and 100 mole % of aromatic C—O—P carbons and 0 mole % C—OH carbons.

Example 8

A resorcinol carbonate (RC) from a reaction between resorcinol and diphenyl carbonate having a hydroxyl number of 455 (148.0 grams; 0.6 mole), di-(2,6-xylyl) chlorophosphate (DXCP; the synthesis of this compound is described in European Patent No. EP 509506 A2) (91 wt %; 382.3 grams; 1.2 moles), and dry acetone (1.4 L) were charged in a 4 L resin kettle with a mechanical stirrer, a thermometer, an addition funnel, a reflux condenser with a $CaCl_2$ tube, and a heating mantle. The reaction mixture was stirred at 20-25° C. with a $N_2$ sweep. A solution of triethylamine (128.1 grams, 1.26 moles) dissolved in dry acetone (600 mL) was added dropwise to the flask for 2.7 hr at 20-25° C. The temperature was maintained for an additional 4.2 hours. The precipitate (triethylamine-HCl salts) was filtered out and the acetone removed via distillation. The product was dissolved in 2 L toluene and washed 4 times with 500 mL distilled water. After the toluene was distilled off, a product (480 grams) was formed as a cloudy tan semi-solid. A C-13 NMR analysis showed the following product composition: 55 mole % of organic carbonate C=O carbons and C—O—P carbons from resorcinol rings, 43 mole % of aromatic C—O—P carbons from xylyl rings, and 2 mole % of unreacted aromatic C—OH carbons. The product had a viscosity of 380 cps at 100° C. and a density of 1.21 at 80° C., and contained 7.4 wt % of phosphorus. After the product was re-dissolved in toluene (1.5 L), the solution was washed two times with 0.5 wt % of NaOH (100 g each) and 6 times with distilled water (100 g each). Next, the toluene was removed by distillation.

Thermal Stability Data

The thermal stabilities of resorcinol carbonate-based phosphate ester compounds of Examples 6 and 8 and FYROLFLEX® RDP, a control, were determined by thermogravimetric analysis (TGA) under air at a heating rate of 10° C./minute in the temperature range between 25° C. and 700° C. FYROLFLEX® RDP is a resorcinol diphenyl phosphate ester flame retardant available from Akzo Nobel Chemical Inc., Dobbs Ferry, N.Y. The TGA analysis results of Example 1 and FYROLFLEX® RDP are presented in Table 1.

TABLE 1

| Weight Loss by TGA: | Temperature (° C.) at Given Weight Loss | | | | |
|---|---|---|---|---|---|
| | 1% | 5% | 10% | 25% | 50% |
| Control | 248 | 309 | 346 | 383 | 410 |
| Example 6 | 245 | 304 | 348 | 391 | 427 |
| Example 8 | 255 | 312 | 342 | 380 | 410 |

The data shown in Table 1 suggest that Examples 6 and 8, resorcinol carbonate-based phosphate ester compounds, exhibit equal or better thermal stability properties than FYROLFLEX® RDP, a resorcinol-based phosphate ester.

Polymer Processing and Testing

Example 9

Physical Testing of PC/ABS Blends Containing Flame Retardant of Example 5

The resorcinol carbonate-based flame retardant of Example 5 was added to a polycarbonate and acrylonitrile-butadiene-styrene terpolymer (PC/ABS) blend in a Coperion ZSK-30 twin-screw extruder (obtained from Coperion Corporation, Ramsey, N.J.) in such a way that the phosphorus content was present at 1.0 wt % concentration in the final blended material. The PC/ABS blend used was a specially formulated blend that lacks any flame retardant but contains the same PC/ABS terpolymer in commercially available BAYBLEND® FR2010. The skilled artisan will recognize that BAYBLEND® FR2010 (Bayer Material Sciences, Pittsburgh, Pa.) has a flame retardant incorporated therein. The twin-screw extruder was operated at approximately 55-65 g/minute flow rate and the barrel temperature profile was (in direction from feed to nozzle): 190, 240, 240, 245, 250, 257° C. The flame retardant was added using a liquid addition system consisting of a heated reservoir and tubing, a Zenith gear pump, and a liquid addition nozzle. The liquid addition system was held at 44° C. The flame retardant was added to the extruder at 120 psi (827 kPa) through a liquid injection nozzle. The flame retardant-containing pellets were dried and molded into test specimens using an Arburg Allrounder injection molder, with the following temperature profile from feed to nozzle: 243, 253, 258, 265° C. The mold temperature was 190° F. Specimens were conditioned for greater than 40 hours at 23° C. and 50% humidity. The phosphorus content, heat deflection temperature, melt flow index, notched IZOD impact strength, tensile strength and modulus, flexural modulus, and flammability property were evaluated. The results, along with those of comparative examples (Controls 1 and 2), are shown in Table 2.

Example 10

Physical Testing of PC/ABS Blends Containing Flame Retardant of Example 8

The resorcinol carbonate-based flame retardant of Example 8 was added into the specially formulated PC/ABS blend of Example 9 in a Coperion ZSK-30 twin-screw extruder. The twin-screw extruder was operated at approximately 60 g/minutes flow rate and the barrel temperature profile was (in direction from feed to nozzle): 190, 240, 240, 245, 250, 257° C. The flame retardant was added using a liquid addition system consisting of a heated reservoir and tubing, a Zenith gear pump, and a liquid addition nozzle. The liquid addition system was held at 96° C. The flame retardant was added to the extruder at 120 psi (827 kPa) through a liquid injection nozzle. The flame retardant-containing pellets were dried and molded into test specimens using an Arburg Allrounder injection molder, with the following temperature profile from feed to nozzle: 243, 253, 258, 265° C. The mold temperature was 190° F. Specimens were conditioned for greater than 40 hrs at 23° C. and 50% humidity. The phosphorus content, heat deflection temperature, melt flow index, notched IZOD impact strength, tensile strength and modulus, flexural modulus, and flammability property were evaluated. The results, along with those of comparative examples (Controls 1 and 2), are shown in Table 2.

Comparative Example 1 (Control 1)

Physical Testing of BAYBLEND® FR2010

Test specimens of BAYBLEND® FR2010, a commercial PC/ABS blend from Bayer with a flame retardant, were injection molded as described in Example 9 above. The phosphorus content, heat deflection temperature, melt flow index, notched IZOD impact strength, tensile strength and modulus, flexural modulus, and flammability property of Control 1 were evaluated. The results are listed in Table 2.

Comparative Example 2 (Control 2)

Physical Testing of PC/ABS Blend Containing FYROLFLEX® RDP Flame Retardant

The commercial flame retardant FYROLFLEX® RDP (Akzo Nobel Functional Chemicals LLC), a resorcinol bis(diphenyl phosphate), was added into the specially formulated PC/ABS blend of Example 9 in the twin-screw extruder as was performed in Example 9 above. Test specimens were then injection molded. The phosphorus content, heat deflection temperature, melt flow index, notched IZOD impact strength, tensile strength and modulus, flexural modulus, and flammability property of Control 2 were evaluated. The results are listed in Table 2.

The phosphorus content of each of Controls 1 and 2 and Examples 4(a) and 4(b) was measured by the following spectrophotometric technique. A sample was decomposed by treatment with sulfuric acid and nitric acids, and then boiled in a dilute acid to convert phosphate groups in the sample to ortho-phosphate. The ortho-phosphate was complexed with ammonium molybdate and ammonium vanadate in an acid solution. The amount of ortho-phosphate and thus the phosphorus content was measured spectrophotometrically by a Beckman UV/Visible spectrophotometer (model DU, from Beckman Coulter, Inc., Fullerton, Calif.) at a wavelength of 470 nm.

The heat deflection temperature at 264 psi fiber stress of each sample was measured by ASTM D648. The melt flow index of each sample was measured by ASTM D1238. The notched IZOD impact strength of each sample was measured by ASTM D256. The tensile strength and modulus of each sample were measured by ASTM D638. The flexural modulus of each sample was measured by ASTM D790. The flammability property of each sample was measured by Underwriters Laboratories UL-94 vertical burn test. All of the above standard tests are incorporated herein by reference.

TABLE 2

|  | Control 1 | Control 2 | Example 9 | Example 10 |
|---|---|---|---|---|
| Phosphorus Content in PC/ABS (Weight %) | 0.99 | 1.01 | 0.99 | 1.0 (Approx.) |
| Physical Properties |  |  |  |  |
| Melt Flow Index (g/10 Min.) | 28.6 | 26.1 | 31.7 | 35.1 |
| Heat Distortion Temperature (° C.) | 90.5 | 90 | 91.5 | 91.2 |
| Notched Izod (ft-lb/in) | 11.2 | 9.8 | 10.1 | 3.9 |
| Tensile Properties |  |  |  |  |
| Strength (MPa) | 58.5 | 57.7 | 60.3 | 58.9 |
| Modulus (GPa) | 2.77 | NA | 2.54 | 2.61 |
| Flexural Property |  |  |  |  |
| Modulus (GPa) | 2.83 | 2.78 | 2.84 | 2.74 |
| UL-94 Vertical Burn Test |  |  |  |  |
| Flammability Rating (1/16") | V-0 | V-0 | V-0 | V-0 |
| Total After Flame Time (Sec, Set of 5 samples) | 16.9 | 9.4 | 16.4 | 30.8 |

While the invention has been described with respect to a limited number of embodiments, the specific features of one embodiment should not be attributed to other embodiments of the invention. No single embodiment is representative of all aspects of the invention. In some embodiments, the compositions or methods may include numerous compounds or steps not mentioned herein. In other embodiments, the compositions or methods do not include, or are substantially free of, any compounds or steps not enumerated herein. Variations and modifications from the described embodiments exist. The method of making the flame retardants may be described as comprising a number of acts or steps. These steps or acts may be practiced in any sequence or order unless otherwise indicated. Finally, any number disclosed herein should be construed to mean approximate, regardless of whether the word "about" or "approximately" is used in describing the number. For example, U.S. Pat. Nos. 6,784,234; 6,632,442; 6,630,524; 6,610,765; 6,552,131; 6,448,316; 6,350,804; 6,316,579; 6,204,313; 6,174,942; 6,111,016; 6,083,428; 6,075,158; 5,869,184; 5,864,004; 5,206,281; 5,204,304; and 4,246,169 disclose various compositions and methods that can be used in embodiments of the invention, with or without modifications. As such, all of the above-mentioned patents, as well as other patents, patent applications and journal references cited herein, are incorporated herein by reference in their entirety. The appended claims intend to cover all those modifications and variations as falling within the scope of the invention.

What is claimed is:

1. A flame retardant comprising at least a phosphate ester compound having the formula:

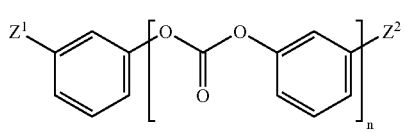

(I)

wherein each of $Z^1$ and $Z^2$ is independently a phosphate ester group; and n is an integer between 1 and 10.

2. The flame retardant of claim 1 comprising more than one phosphate ester compound of Formula (I).

3. The flame retardant of claim 2 comprising a first phosphate ester compound of Formula (I) having an n value of 1 and a second phosphate ester compound of Formula (I) having an n value of 2.

4. The flame retardant of claim 3, further comprising a resorcinol phosphate ester having the formula:

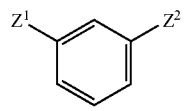

wherein each of $Z^1$ and $Z^2$ is independently a phosphate ester group.

5. The flame retardant of claim 1, wherein the phosphate ester group has the formula:

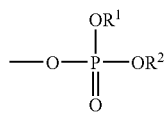

(II)

wherein each of $R^1$ and $R^2$ is independently alkyl, alkenyl, alkynyl, aryl, cycloalkyl, furyl, thienyl, pyrrolyl, indolyl, indolizinyl, isoindolyl, pyrazolyl, imidazolyl, thiazolyl, thiadiazolyl, benzothiazolyl, 1,2,4-triazolyl, 1,2,3-triazolyl, indazolyl, benzotriazolyl, benzimidazolyl, indazolyl carbazolyl, carbolinyl, benzofuranyl, isobenzofuranyl benzothiophenyl, dibenzofuranyl, dibenzothiophenyl, isothiazolyl, isoxazolyl, pyridyl, purinyl, pyridazinyl, pyrimidinyl, pyrazinyl, triazinyl, tetrazinyl, petazinyl, quinolinyl, isoquinolinyl, perimidinyl, cinnolinyl, phthalazinyl, quinazolinyl, quinoxalinyl, naphthyridinyl, acridinyl, phenanthridinyl, phenanthrodinyl, anthyridinyl, purinyl, pteridinyl, alloxazinyl, phenazinyl, phenothiazinyl, phenoxazinyl, phenoxathiinyl, dibenzo(1,4)dioxinyl, thianthrenyl, an alkyl group where at least one of the methylene group is replaced by a heteroatom or a hetero-group, or a part of a heterocyclic group when $R^1$ and $R^2$ form the heterocyclic group together with the —O—P(=O)(—O—)—O— fragment; and each of alkyl, alkenyl, alkynyl, aryl, cycloalkyl, and the heterocyclic group is substituted or unsubstituted.

6. The flame retardant of claim 5, wherein each of $R^1$ and $R^2$ is independently aryl.

7. The flame retardant of claim 6, wherein each of $R^1$ and $R^2$ is independently phenyl and n is 1.

8. The flame retardant of claim 1, wherein the phosphate ester group is selected from the group consisting of radicals having the following formulae:

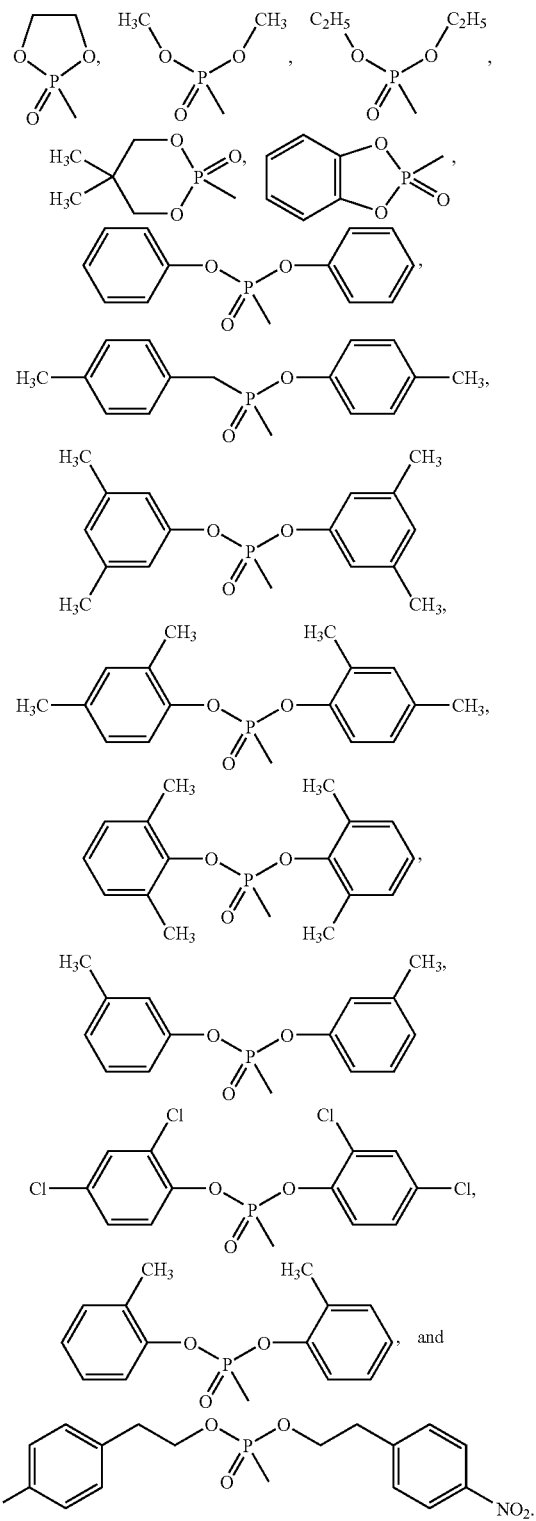

9. A process for preparing a flame retardant of claim 5 comprising the step of reacting a resorcinol carbonate compound having the formula:

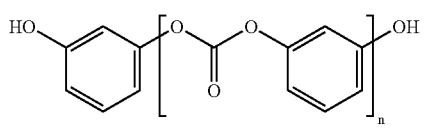

with at least a chlorophosphate compound having the formula:

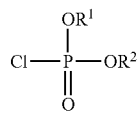

in the presence of a catalyst or an acid acceptor,
wherein n is an integer between 1 and 10;
each of $R^1$ and $R^2$ is independently alkyl, alkenyl, alkynyl, aryl, cycloalkyl, furyl, thienyl, pyrrolyl, indolyl, indolizinyl, isoindolyl, pyrazolyl, imidazolyl, thiazolyl, thiadiazolyl, benzothiazolyl, 1,2,4-triazolyl, 1,2,3-triazolyl, indazolyl, benzotriazolyl, benzimidazolyl, indazolyl carbazolyl, carbolinyl, benzofuranyl, isobenzofuranyl benzothiophenyl, dibenzofuranyl, dibenzothiophenyl, isothiazolyl, isoxazolyl, pyridyl, purinyl, pyridazinyl, pyrimidinyl, pyrazinyl, triazinyl, tetrazinyl, petazinyl, quinolinyl, isoquinolinyl, perimidinyl, cinnolinyl, phthalazinyl, quinazolinyl, quinoxalinyl, naphthyridinyl, acridinyl, phenanthridinyl, phenanthrolinyl, anthyridinyl, purinyl, pteridinyl, alloxazinyl, phenazinyl, phenothiazinyl, phenoxazinyl, phenoxathiinyl, dibenzo(1,4)dioxinyl, thianthrenyl, an alkyl group where at least one of the methylene group is replaced by a heteroatom or a hetero-group, or a part of a heterocyclic group when $R^1$ and $R^2$ form the heterocyclic group together with the —O—P(=O)(—Cl)—O— fragment; and
each of alkyl, alkenyl, alkynyl, aryl, cycloalkyl, and the heterocyclic group is substituted or unsubstituted.

10. The process of claim 9, wherein the reaction occurs in an inert organic solvent.

11. The process of claim 10, wherein the inert organic solvent is selected from the group consisting of toluene, benzene, xylene, methylene chloride, chloroform, acetonitrile, ethers, and ketones.

12. The process of claim 9, wherein the catalyst is magnesium chloride, aluminum trichloride, titanium tetrachloride, or zinc dichloride.

13. The process of claim 12, wherein the solvent is toluene and the reaction temperature is greater than about 100° C.

14. The process of claim 9, wherein the acid acceptor is triethylamine.

15. The process of claim 14, wherein the solvent is methylene chloride and the reaction temperature is less than 35° C.

16. The process of claim 9, wherein the flame retardant comprises more than one phosphate ester compound of Formula (I).

17. The process of claim 16, wherein the flame retardant comprises a first phosphate ester compound of Formula (I) having an n value of 1 and a second phosphate ester compound of Formula (I) having an n value of 2.

18. The process of claim 17, wherein the flame retardant further comprises a resorcinol phosphate ester having the formula:

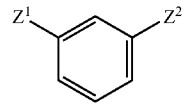

wherein each of $Z^1$ and $Z^2$ is independently a phosphate ester group.

19. The process of claim 9, wherein the mole ratio of the chlorophosphate compound to the resorcinol carbonate compound is greater than or equal to 2:1.

20. The process of claim 9, wherein the resorcinol carbonate compound of Formula (III) is prepared by reacting resorcinol with phosgene in a solvent.

21. The process of claim 20, wherein the reaction occurs in the presence of a base catalyst.

22. The process of claim 9, wherein the resorcinol carbonate compound of Formula (III) is prepared by reacting resorcinol with diphenyl carbonate in the absence of a solvent at a temperature sufficient to melt the reactants.

23. The process of claim 22, wherein the reaction occurs in the presence of a catalyst selected from the group consisting of organic bases, triphenylphosphine, quaternary ammonium hydroxides, metal hydroxides, and combinations thereof.

24. The process of claim 23, wherein said organic base is 1-ethylpiperidine.

25. A process for preparing a flame retardant of claim 5, comprising the step of reacting a bis-(dichloro)phosphate compound having the formula:

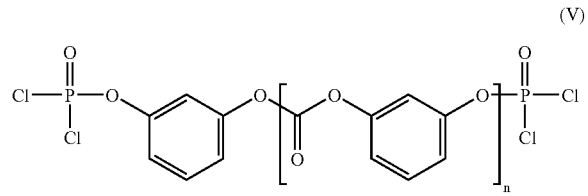

with at least one hydroxyl compound in the presence of a catalyst, wherein n is an integer between 1 and 10.

26. The process of claim 25, wherein the bis-(dichloro)phosphate compound of Formula (V) is prepared by reacting the resorcinol carbonate compound of Formula (III) with phosphorus oxychloride in the presence of a catalyst.

27. The process of claim 25, wherein the reaction occurs in an inert organic solvent.

28. The process of claim 25, wherein the catalyst is an organic base selected from the group consisting of amines, 1-alkylpiperidines, 1-alkylpyrrolidines, pyridine, imidazole, and combinations thereof.

29. The process of claim 25, wherein the catalyst is $MgCl_2$.

30. The process of claim 25, wherein each of $R^1$ and $R^2$ is independently aryl.

31. The process of claim 28, wherein each of $R^1$ and $R^2$ is independently phenyl and n is 1.

32. A flame retardant composition comprising a polymer and a flame retardant of claim 1.

33. The flame retardant composition of claim 32, wherein the polymer is selected from the group consisting of polycarbonates, poly(phenylene oxide), polyarylates, polymethacrylates, polyesters, acrylonitrile-butadiene-styrene terpolymer, high-impact polystyrene, and combinations or blends thereof.

34. The flame retardant composition of claim 32 further comprising at least an additive selected from the group consisting of extenders, fibers, fillers, coupling agents, cross-linking agents, plasticizers, impact modifiers, compatibilizers, anti-blocking agents, anti-fogging agents, anti-aging agents, antioxidants, UV stabilizers, antiozonants, acid scavengers, processing aids, surfactants, lubricants, plasticizing agents, parting agents and abherents, nucleating agents, antistatic agents, slip agents, chemical blowing agents, fluorescent whitening agents, flow agents, deodorants, release agents, colorants, and anti-microbials.

35. The flame retardant composition of claim 32, wherein the flame retardant composition is substantially free of an additive.

36. An article comprising a flame retardant composition of claim 32.

37. The article of claim 36, wherein the article is selected from the group consisting of plastic products, textiles, wood and paper products, adhesives and sealants, and rubber products, aerospace parts, automotive parts, wires, cables, construction materials, materials for interiors and furnishings, appliances, electronic components, computers, and business machines.

38. The article of claim 36, wherein the polymer is selected from the group consisting of polycarbonates, poly(phenylene oxide), polyarylates, polymethacrylates, polyesters, acrylonitrile-butadiene-styrene terpolymer, high-impact polystyrene, and combinations or blends thereof.

39. The article of claim 36, wherein the flame retardant composition further comprises at least an additive selected from the group consisting of extenders, fibers, fillers, coupling agents, cross-linking agents, plasticizers, impact modifiers, compatibilizers, anti-blocking agents, anti-fogging agents, anti-aging agents, antioxidants, UV stabilizers, antiozonants, acid scavengers, processing aids, surfactants, lubricants, plasticizing agents, parting agents and abherents, nucleating agents, anti-static agents, slip agents, chemical blowing agents, fluorescent whitening agents, flow agents, deodorants, release agents, colorants, and anti-microbials.

40. The article of claim 36, wherein the flame retardant composition is substantially free of an additive.

* * * * *